(12) United States Patent
Kim et al.

(10) Patent No.: US 11,164,586 B2
(45) Date of Patent: Nov. 2, 2021

(54) ARTIFICIAL INTELLIGENCE APPARATUS AND METHOD FOR RECOGNIZING UTTERANCE VOICE OF USER

(71) Applicant: LG ELECTRONICS INC., Seoul (KR)

(72) Inventors: Jaehong Kim, Seoul (KR); Hyoeun Kim, Seoul (KR); Hangil Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 146 days.

(21) Appl. No.: 16/557,377

(22) Filed: Aug. 30, 2019

(65) Prior Publication Data
US 2019/0385614 A1    Dec. 19, 2019

(30) Foreign Application Priority Data
Aug. 21, 2019    (KR) .......................... 10-2019-0102695

(51) Int. Cl.
| | | |
|---|---|---|
| *G10L 15/32* | (2013.01) | |
| *G10L 25/84* | (2013.01) | |
| *G10L 15/22* | (2006.01) | |
| *G10L 15/06* | (2013.01) | |

(52) U.S. Cl.
CPC ............ *G10L 15/32* (2013.01); *G10L 15/063* (2013.01); *G10L 15/22* (2013.01); *G10L 25/84* (2013.01)

(58) Field of Classification Search
CPC ....... G10L 15/20; G10L 15/063; G10L 15/32; G10L 25/84; G10L 15/16; G10L 15/22; G10L 21/0232
See application file for complete search history.

(56) References Cited

U.S. PATENT DOCUMENTS

| | | | | |
|---|---|---|---|---|
| 9,384,736 | B2* | 7/2016 | Labsky | ................... G10L 15/30 |
| 9,674,328 | B2* | 6/2017 | Juneja | ................... G10L 15/005 |
| 10,032,455 | B2* | 7/2018 | Newman | ................. G10L 15/30 |
| 10,714,072 | B1* | 7/2020 | Bodon | ................. H04R 1/1041 |

(Continued)

FOREIGN PATENT DOCUMENTS

| | | |
|---|---|---|
| KR | 10-2004-0010860 A | 2/2004 |
| KR | 10-2018-0119070 A | 11/2018 |
| WO | WO 2018/189031 A1 | 10/2018 |

*Primary Examiner* — Mohammad K Islam
(74) *Attorney, Agent, or Firm* — Birch, Stewart, Kolasch & Birch, LLP

(57) ABSTRACT

Embodiments provide an artificial intelligence apparatus for recognizing an utterance voice of a user. The artificial intelligence apparatus includes: a communication unit configured to communicate with at least one external artificial intelligence apparatus which obtains first sound data including the utterance voice of the user to generate a first speech recognition result from the first sound data; a microphone configured to obtain second sound data including the utterance voice; and a processor configured to receive first speech recognition results from each of the at least one external artificial intelligence apparatus, generate a second speech recognition result from the second sound data, generate a final speech recognition result for the utterance voice by using the first speech recognition results and the second speech recognition result, and perform a control corresponding to the final speech recognition result.

12 Claims, 11 Drawing Sheets

(56) References Cited

U.S. PATENT DOCUMENTS

| | | | |
|---|---|---|---|
| 10,748,529 B1* | 8/2020 | Milden | G10L 15/22 |
| 10,896,675 B1* | 1/2021 | Lam | G10L 15/30 |
| 2013/0073293 A1* | 3/2013 | Jang | G10L 15/22 |
| | | | 704/275 |
| 2015/0120288 A1* | 4/2015 | Thomson | G10L 15/22 |
| | | | 704/231 |
| 2017/0064427 A1* | 3/2017 | Rich | H04R 1/1025 |
| 2017/0133000 A1* | 5/2017 | Hendrix | G10K 11/17854 |
| 2018/0268837 A1* | 9/2018 | Ganeshkumar | G10L 21/0216 |
| 2018/0286425 A1* | 10/2018 | Baek | G10L 21/0232 |
| 2018/0350381 A1* | 12/2018 | Bryan | G10L 21/0272 |
| 2019/0206403 A1* | 7/2019 | Jeong | G06F 3/167 |
| 2019/0212976 A1* | 7/2019 | Fountaine | G06F 3/167 |
| 2020/0135194 A1 | 4/2020 | Jeong | |
| 2020/0146097 A1* | 5/2020 | Haartsen | H04W 52/0254 |
| 2020/0160838 A1* | 5/2020 | Lee | G10L 15/16 |
| 2020/0213729 A1* | 7/2020 | Soto | H04R 29/005 |
| 2020/0336846 A1* | 10/2020 | Rohde | G10L 25/78 |
| 2020/0374269 A1* | 11/2020 | Lidman | G10L 15/30 |
| 2021/0044889 A1* | 2/2021 | Liu | H04R 1/1075 |

\* cited by examiner

ARTIFICIAL INTELLIGENCE APPARATUS AND METHOD FOR RECOGNIZING UTTERANCE VOICE OF USER

CROSS-REFERENCE TO RELATED APPLICATIONS

The present application claims priority under 35 U.S.C. 119 and 35 U.S.C. 365 to Korean Patent Application No. 10-2019-0102695 filed on Aug. 21, 2019, which is hereby incorporated by reference in its entirety.

BACKGROUND

The present disclosure relates to an artificial intelligence apparatus and a method for recognizing an utterance voice of a user. More particularly, the present disclosure relates to an artificial intelligence apparatus and a method for recognizing an utterance voice of a user by attempting to recognize the utterance voice of the user through a plurality of artificial intelligence apparatuses, and collecting speech recognition results from each of the artificial intelligence apparatuses.

Recently, there is a trend that services that employ a speech recognition technology such as artificial intelligence speakers, voice control, and voice secretary. In addition, users having a plurality of artificial intelligence apparatuses in one space are increasing.

However, in the related art, even if a user speaks in a space provided with the artificial intelligence apparatuses, each of the artificial intelligence apparatuses individually attempts speech recognition.

If speech recognition results of the artificial intelligence apparatuses are properly collected, an utterance voice of the user may be recognized with higher accuracy.

SUMMARY

Embodiments provide an artificial intelligence apparatus and a method thereof, in which weights between artificial intelligence apparatuses are determined in consideration of an environment at an utterance time of a user, and speech recognition results for an utterance voice of the user that are obtained from each of the artificial intelligence apparatuses are collected based on the determined weights so as to generate a final speech recognition result.

In one embodiment, there are provided an artificial intelligence apparatus and a method thereof, in which a speech recognition result generated from voice data corresponding to an utterance voice of a user is received from at least one artificial intelligence apparatus, a speech recognition result is directly generated from the voice data corresponding to the utterance voice of the user, a final speech recognition result is generated by using the received speech recognition result and the generated speech recognition result, and a control corresponding to the generated final speech recognition result is performed.

In addition, in one embodiment, there are provided an artificial intelligence apparatus and a method thereof, in which an environment variable corresponding to an utterance time is determined based on the received voice data, a weight for each of the artificial intelligence apparatuses is determined based on the determined environment variable, and the final speech recognition result is generated from the received speech recognition result and the generated speech recognition result based on the determined weight.

In addition, in one embodiment, there are provided an artificial intelligence apparatus and a method thereof, in which a noise type included in sound data is determined, and the weight for each of the artificial intelligence apparatuses is determined based on the determined noise type.

The details of one or more embodiments are set forth in the accompanying drawings and the description below. Other features will be apparent from the description and drawings, and from the claims.

DETAILED DESCRIPTION OF THE EMBODIMENTS

Figure 1:
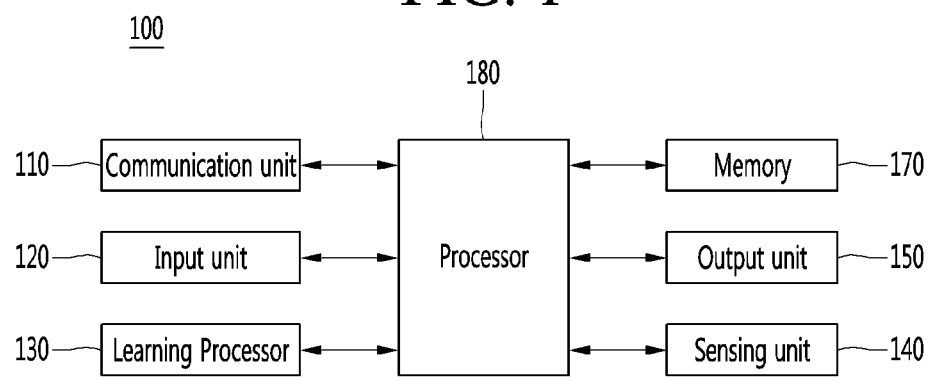
FIG. 1 is a block diagram illustrating an AI apparatus according to an embodiment of the present invention.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for training data is given, and the label may mean the correct answer (or result value) that the artificial neural network must infer when the training data is input to the artificial neural network. The unsupervised learning may refer to a method of learning an artificial neural network in a state in which a label for training data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

Here, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 is a block diagram illustrating an AI apparatus 100 according to an embodiment of the present invention.

Hereinafter, the AI apparatus 100 may be referred to as a terminal.

The AI apparatus (or an AI device) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI apparatus 100 may include a communication unit 110, an input unit 120, a learning processor 130, a sensing unit 140, an output unit 150, a memory 170, and a processor 180.

The communication unit 110 may transmit and receive data to and from external devices such as other AI apparatuses 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

Here, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire training data for model learning and input data to be used when an output is acquired by using learning model. The input unit 120 may acquire raw input data. Here, the processor 180 or the learning processor 130 may extract an input feature by preprocessing the input data.

The learning processor 130 may learn a model composed of an artificial neural network by using training data. The learned artificial neural network may be referred to as a learning model. The learning model may be used to an infer result value for new input data rather than training data, and the inferred value may be used as a basis for determination to perform a certain operation.

Here, the learning processor 130 may perform AI processing together with the learning processor 240 of the AI server 200.

Here, the learning processor 130 may include a memory integrated or implemented in the AI apparatus 100. Alternatively, the learning processor 130 may be implemented by using the memory 170, an external memory directly connected to the AI apparatus 100, or a memory held in an external device.

The sensing unit 140 may acquire at least one of internal information about the AI apparatus 100, ambient environment information about the AI apparatus 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

Here, the output unit 150 may include a display unit for outputting time information, a speaker for outputting auditory information, and a haptic module for outputting haptic information.

The memory 170 may store data that supports various functions of the AI apparatus 100. For example, the memory 170 may store input data acquired by the input unit 120, training data, a learning model, a learning history, and the like.

The processor 180 may determine at least one executable operation of the AI apparatus 100 based on information determined or generated by using a data analysis algorithm or a machine learning algorithm. The processor 180 may control the components of the AI apparatus 100 to execute the determined operation.

To this end, the processor 180 may request, search, receive, or utilize data of the learning processor 130 or the memory 170. The processor 180 may control the components of the AI apparatus 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI apparatus 100 so as to drive an application program stored in memory 170. Furthermore, the processor 180 may operate two or more of the components included in the AI apparatus 100 in combination so as to drive the application program.

Figure 2:
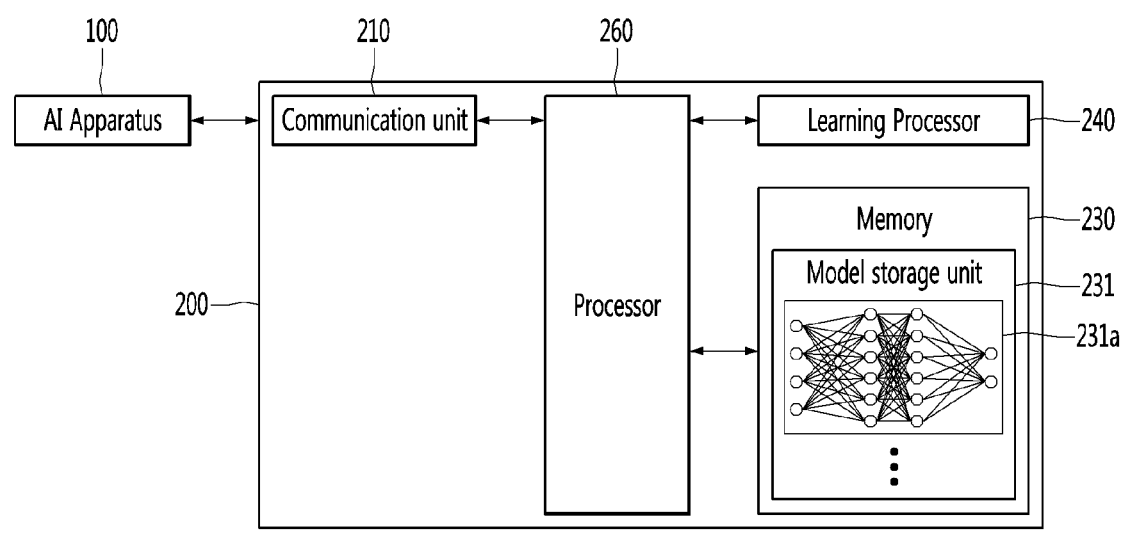
FIG. 2 is a block diagram illustrating an AI server according to an embodiment of the present invention.

FIG. 2 is a block diagram illustrating an AI server 200 according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. Here, the AI server 200 may be included as a partial configuration of the AI apparatus 100, and may perform at least part of the AI processing together.

The AI server 200 may include a communication unit 210, a memory 230, a learning processor 240, a processor 260, and the like.

The communication unit 210 can transmit and receive data to and from an external device such as the AI apparatus 100.

The memory 230 may include a model storage unit 231. The model storage unit 231 may store a learning or learned model (or an artificial neural network 231*a*) through the learning processor 240.

The learning processor 240 may learn the artificial neural network 231*a* by using the training data. The learning model may be used in a state of being mounted on the AI server 200 of the artificial neural network, or may be used in a state of being mounted on an external device such as the AI apparatus 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
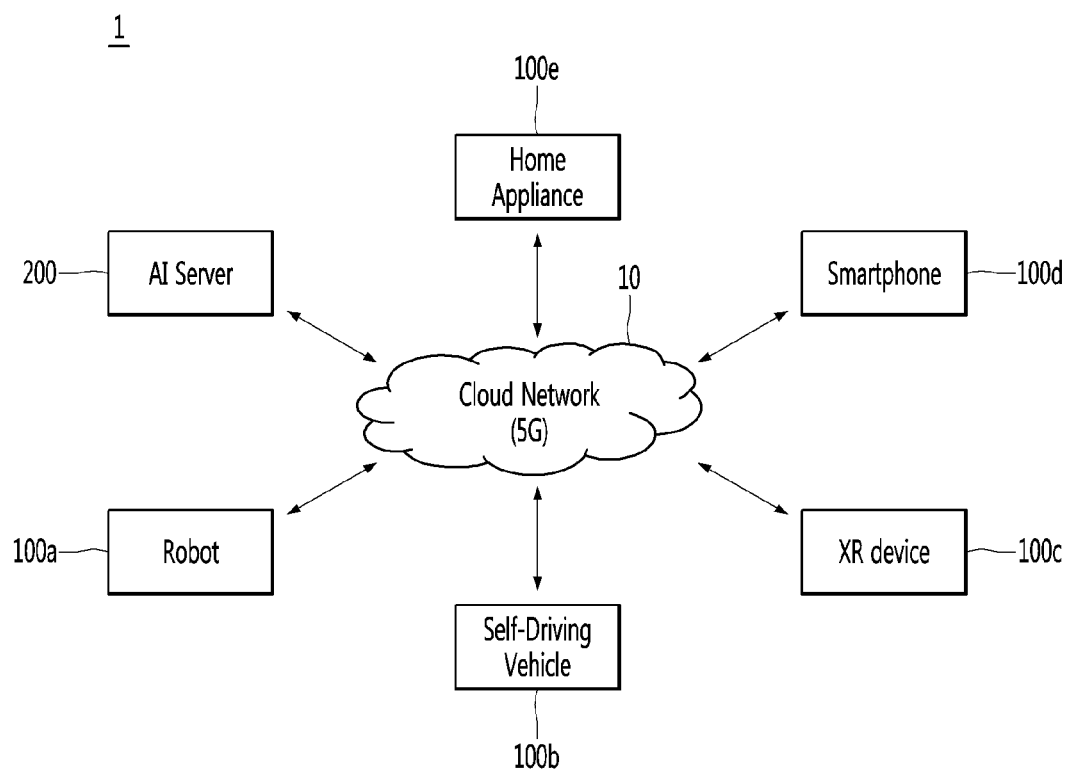
FIG. 3 is a view illustrating an AI system according to an embodiment of the present invention.

FIG. 3 is a view illustrating an AI system 1 according to an embodiment of the present invention.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI apparatuses 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI apparatuses constituting the AI system 1, that is, the robot 100a, the self-driving vehicle 100b, the XR device 100e, the smartphone 100d, or the home appliance 100e through the cloud network 10, and may assist at least part of AI processing of the connected AI apparatuses 100a to 100e.

Here, the AI server 200 may learn the artificial neural network according to the machine learning algorithm instead of the AI apparatuses 100a to 100e, and may directly store the learning model or transmit the learning model to the AI apparatuses 100a to 100e.

Here, the AI server 200 may receive input data from the AI apparatuses 100a to 100e, may infer the result value for the received input data by using the learning model, may generate a response or a control command based on the inferred result value, and may transmit the response or the control command to the AI apparatuses 100a to 100e.

Alternatively, the AI apparatuses 100a to 100e may infer the result value for the input data by directly using the learning model, and may generate the response or the control command based on the inference result.

Hereinafter, various embodiments of the AI apparatuses 100a to 100e to which the above-described technology is applied will be described. The AI apparatuses 100a to 100e illustrated in FIG. 3 may be regarded as a specific embodiment of the AI apparatus 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

Here, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external device to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. Here, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling route by using the recognized surrounding information or object information. The learning model may be learned directly from the self-driving vehicle 100a or may be learned from an external device such as the AI server 200.

Here, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external device to determine the travel route and the travel plan, and may control the driving unit such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. Here, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

Here, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given route without the user's control or moves for itself by determining the route by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

Here, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

Here, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
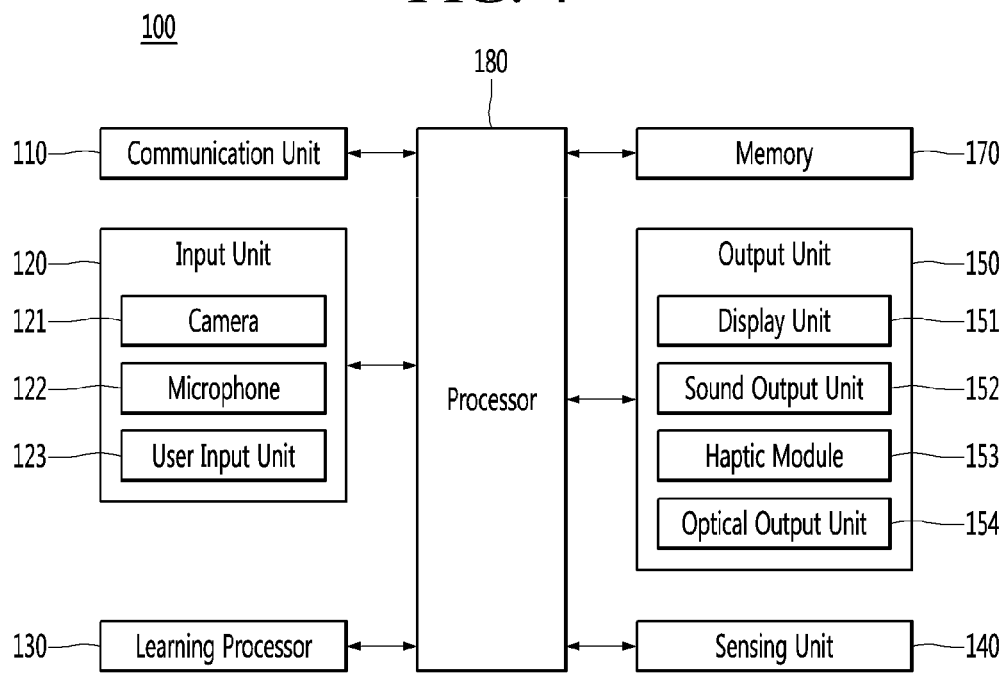
FIG. 4 is a block diagram illustrating an AI apparatus according to an embodiment of the present invention.

FIG. 4 is a block diagram illustrating an AI apparatus 100 according to an embodiment of the present invention.

The redundant repeat of FIG. 1 will be omitted below.

Referring to FIG. 4, the input unit 120 may include a camera 121 for image signal input, a microphone 122 for receiving audio signal input, and a user input unit 123 for receiving information from a user.

Voice data or image data collected by the input unit 120 are analyzed and processed as a user's control command.

Then, the input unit 120 is used for inputting image information (or signal), audio information (or signal), data, or information inputted from a user and the AI apparatus 100 may include at least one camera 121 in order for inputting image information.

The camera 121 processes image frames such as a still image or a video obtained by an image sensor in a video call mode or a capturing mode. The processed image frame may be displayed on the display unit 151 or stored in the memory 170.

The microphone 122 processes external sound signals as electrical voice data. The processed voice data may be utilized variously according to a function (or an application program being executed) being performed in the AI apparatus 100. Moreover, various noise canceling algorithms for removing noise occurring during the reception of external sound signals may be implemented in the microphone 122.

The user input unit 123 is to receive information from a user and when information is inputted through the user input unit 123, the processor 180 may control an operation of the AI apparatus 100 to correspond to the inputted information.

The user input unit 123 may include a mechanical input means (or a mechanical key, for example, a button, a dome switch, a jog wheel, and a jog switch at the front, back or side of the AI apparatus 100) and a touch type input means. As one example, a touch type input means may include a virtual key, a soft key, or a visual key, which is displayed on a touch screen through software processing or may include a touch key disposed at a portion other than the touch screen.

The sensing unit 140 may also be referred to as a sensor unit.

The output unit 150 may include at least one of a display unit 151, a sound output module 152, a haptic module 153, or an optical output module 154.

The display unit 151 may display (output) information processed in the AI apparatus 100. For example, the display unit 151 may display execution screen information of an application program running on the AI apparatus 100 or user interface (UI) and graphic user interface (GUI) information according to such execution screen information.

The display unit 151 may be formed with a mutual layer structure with a touch sensor or formed integrally, so that a touch screen may be implemented. Such a touch screen may serve as the user input unit 123 providing an input interface between the AI apparatus 100 and a user, and an output interface between the AI apparatus 100 and a user at the same time.

The sound output module 152 may output audio data received from the wireless communication unit 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the AI apparatus 100. An example of an event occurring in the AI apparatus 100 includes message reception, call signal reception, missed calls, alarm, schedule notification, e-mail reception, and information reception through an application.

Figure 5:
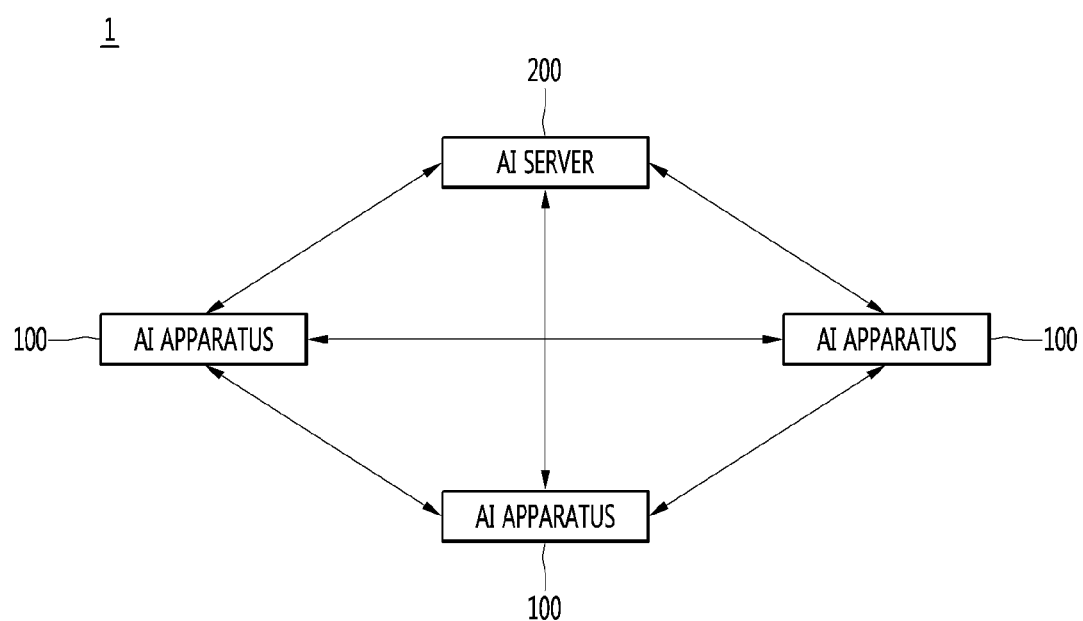
FIG. 5 is a view illustrating an AI system according to an embodiment of the present invention.

FIG. 5 is a view illustrating an AI system 1 according to an embodiment of the present invention.

Referring to FIG. 5, an artificial intelligence system 1 may include a plurality of artificial intelligence apparatuses 100 and an artificial intelligence server 200.

At least some of the artificial intelligence apparatuses 100 or the artificial intelligence server 200 may communicate with each other using a wired or wireless communication technology.

Here, each of apparatuses 100 and 200 may communicate with each other through a base station, a router, or the like, and may directly communicate with each other using a short range communication technology.

For example, each of the apparatuses 100 and 200 may communicate with each other directly or via the base station by using 5$^{th}$ generation (5G) communication.

In FIG. 5, the artificial intelligence server 200 is shown as being included in the artificial intelligence system 1, but the present invention is not limited thereto. In other words, the artificial intelligence system 1 may not include the artificial intelligence server 200, but may include only a plurality of artificial intelligence apparatuses 100.

In one embodiment, the artificial intelligence server 200 may receive data required for recognizing a voice of a user from the artificial intelligence apparatuses 100, and may recognize an utterance voice of the user based on the received data.

In one embodiment, the artificial intelligence apparatus 100 may receive the data required for recognizing the voice of the user from other artificial intelligence apparatuses 100, and may recognize the utterance voice of the user based on data obtained by the artificial intelligence apparatus 100 and the received data. In this case, the artificial intelligence apparatus 100 that receives the data required for recognizing the voice of the user from other artificial intelligence apparatuses 100 to recognize the utterance voice of the user may operate as a master artificial intelligence apparatus in relation to other artificial intelligence apparatuses 100.

In the following, the artificial intelligence apparatus 100 or the artificial intelligence server 200 configured to control other artificial intelligence apparatuses 100 and recognize the voice of the user by using other artificial intelligence apparatuses 100 may be referred to as a master artificial intelligence apparatus. In other words, the master artificial intelligence apparatus may be the artificial intelligence apparatus 100 or may be the artificial intelligence server 200. In addition, the artificial intelligence apparatuses 100 controlled by the master artificial intelligence apparatus may be referred to as slave artificial intelligence apparatuses.

The master artificial intelligence apparatus may be configured to communicate with the slave artificial intelligence apparatuses, and may control the slave artificial intelligence apparatuses. Accordingly, the master artificial intelligence apparatus may organically control a plurality of artificial intelligence apparatuses 100 by controlling the slave artificial intelligence apparatuses.

The data required for recognizing the utterance voice of the user may include sound data corresponding to the utterance voice of the user, a speech recognition result obtained from the sound data by using a speech recognition model, and the like.

Figure 6:
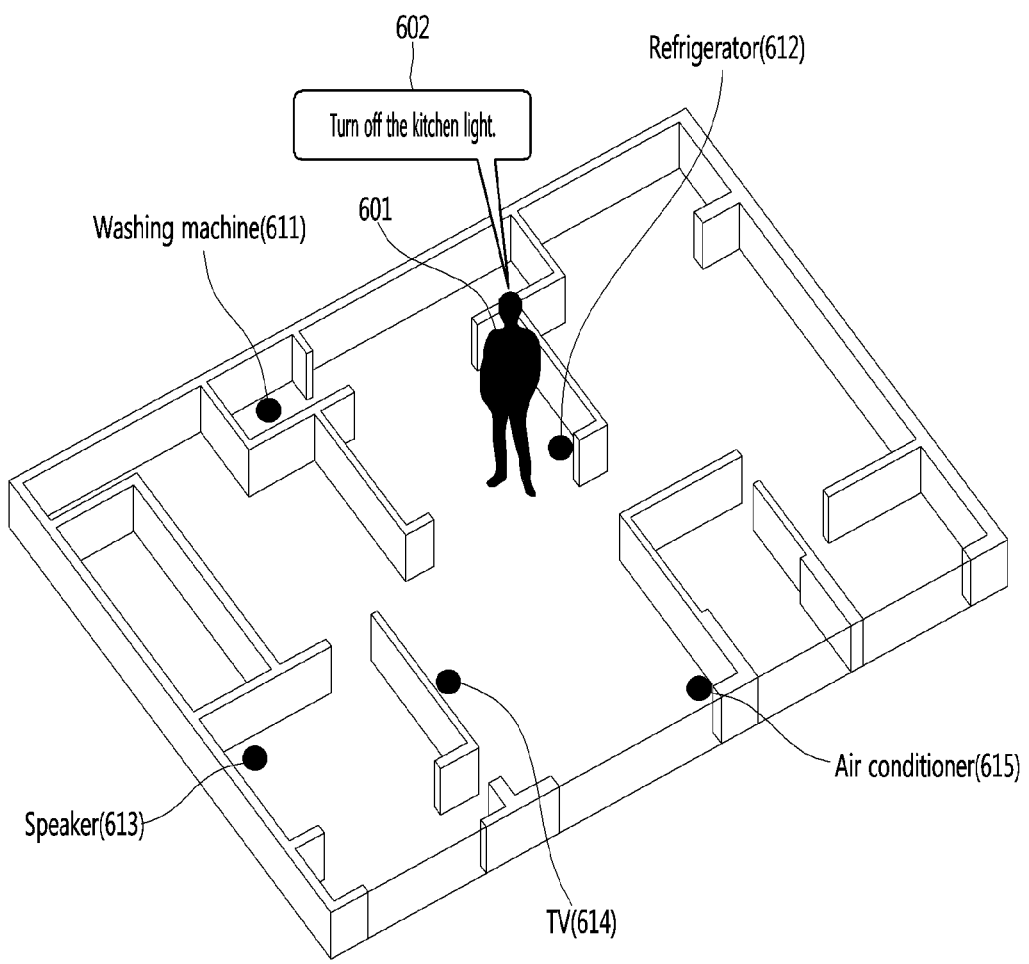
FIG. 6 is a view illustrating an AI system according to an embodiment of the present invention.

FIG. 6 is a view illustrating an AI system 1 according to an embodiment of the present invention.

Referring to FIG. 6, the artificial intelligence system according to one embodiment may include a plurality of artificial intelligence apparatuses 611 to 615. Although not shown in FIG. 6, the artificial intelligence system 1 may include the artificial intelligence server 200.

For example, the artificial intelligence system 1 may include a washing machine 611, a refrigerator 612, a speaker 613, a TV 614, an air conditioner 615, and the like as the artificial intelligence apparatuses 100.

Each of the artificial intelligence apparatuses 611 to 615 may be provided with a microphone 122 to obtain sound data of a user 601.

As shown in FIG. 6, the user 601 may utter a control command or a query to perform a specific operation by using the artificial intelligence system 1. In addition, the utterance voice of the user 601 may be received through the artificial intelligence apparatuses 611 to 615.

The utterance voice of the user 601 received by each of the artificial intelligence apparatuses 611 to 615 may vary depending on a distance to the user 601 or a spatial structure. In addition, speech recognition models (or speech recognition engines) used by the artificial intelligence apparatuses 611 to 615 may be different from each other, so that speech recognition accuracies of the artificial intelligence apparatuses 611 to 615 may be different from each other.

The artificial intelligence apparatus 100 or the artificial intelligence server 200 functioning as the master artificial intelligence apparatus in the artificial intelligence system 1 may recognize the voice of the user 601 more accurately by using speech recognition results of other artificial intelligence apparatuses 100.

In an example of FIG. 6, the master artificial intelligence apparatus may be one of the washing machine 611, the refrigerator 612, the speaker 613, the TV 614, or the air conditioner 615, or may be the artificial intelligence server 200 which is not shown in FIG. 6.

For example, when the user 601 performs an utterance 602 in a kitchen, such as "Turn off the kitchen light.", the utterance voice of the user 601 may be received by the washing machine 611, the refrigerator 612, the speaker 613, the TV 614, and the air conditioner 615. The master artificial intelligence apparatus may recognize the utterance voice of the user 601 by using speech recognition results of the artificial intelligence apparatuses 611 to 615, and perform necessary operations based on the recognition results.

Each of the artificial intelligence apparatuses 611 to 615 stores a speech recognition model, and may attempt to recognize the utterance voice of the user 601 by using the stored speech recognition model.

In addition, each of the artificial intelligence apparatuses 611 to 615 may store a timestamp that indicates a reception time of the utterance voice. In order to ensure validity of the timestamp, time information of the master artificial intelligence apparatus may be synchronized with time information of the artificial intelligence apparatuses 611 to 615.

The timestamp indicating the reception time of the voice may be used to determine a reception delay time or a reception time difference between the artificial intelligence apparatuses 611 to 615, and the master artificial intelligence apparatus may determine positional relation between each of the artificial intelligence apparatuses 611 to 615 and the user 601 based on the reception delay time of each of the artificial intelligence apparatuses 611 to 615. To this end, the master artificial intelligence apparatus may store positional relation between the artificial intelligence apparatuses 611 to 615.

For example, the master artificial intelligence apparatus may determine a direction of the user 601, which is a sound source, from each of the artificial intelligence apparatuses 611 to 615 by using a direction-of-arrival (DOA) algorithm. In addition, the positional relation between each of the artificial intelligence apparatuses 611 to 615 and the user 601 may be determined by collecting directional information representing a location of the user 601 from each of the artificial intelligence apparatuses 611 to 615.

Figure 7:
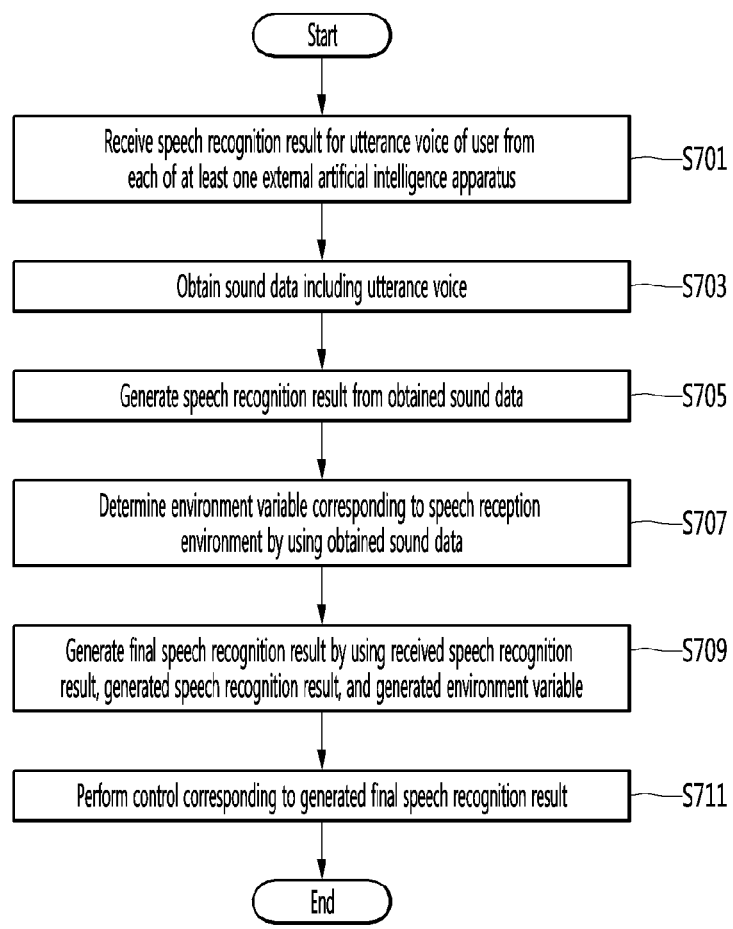
FIG. 7 is a flowchart illustrating a method of recognizing a voice of a user according to one embodiment.

FIG. 7 is a flowchart illustrating a method of recognizing a voice of a user according to one embodiment.

In detail, FIG. 7 illustrates an embodiment in which one artificial intelligence apparatus 100 among the artificial intelligence apparatuses constituting the artificial intelligence system 1 operates as the master artificial intelligence apparatus to recognize the utterance voice of the user.

Referring to FIG. 7, the processor 180 of the artificial intelligence apparatus 100 receives a speech recognition result for the utterance voice of the user from each of at least one external artificial intelligence apparatus through the communication unit 110 (S701).

The external artificial intelligence apparatus is an apparatus having a microphone to perform a function of recognizing an utterance voice of a user, and refers to a slave artificial intelligence apparatus. Meanwhile, the artificial intelligence apparatus 100 that receives the speech recognition result from at least one external artificial intelligence apparatus refers to a master artificial intelligence apparatus.

The external artificial intelligence apparatus may obtain the sound data including the utterance voice of the user, and generate the speech recognition result from the obtained sound data. In addition, the artificial intelligence apparatus 100 may receive the speech recognition results generated from the external artificial intelligence apparatuses. The sound data obtained by each of the external artificial intelligence apparatuses includes the same utterance voice, and the obtained sound data may vary depending on an ambient noise, the spatial structure, the positional relation with the user, and the like.

The obtaining of the sound data may refer to converting a sound wave corresponding to the utterance voice of the user into a sound signal or sound data through a microphone. The generating of the speech recognition result from the sound data may refer to converting the utterance voice into a text.

The external artificial intelligence apparatus may generate the speech recognition result from the sound data by using the speech recognition model individually provided in each external artificial intelligence apparatus. For example, when the artificial intelligence system includes two external artificial intelligence apparatuses, a first external artificial intelligence apparatus may generate a first speech recognition result by using a first speech recognition model, and a second external artificial intelligence apparatus may generate a second speech recognition result by using a second speech recognition model. In addition, the processor 180 of the artificial intelligence apparatus 100 may receive the speech recognition result generated from each of the external artificial intelligence apparatuses.

The speech recognition model may include an artificial neural network, and may be learned by using a machine learning algorithm or a deep learning algorithm. The speech recognition model may be separately trained for each external artificial intelligence apparatus.

Training data used to learn the speech recognition model may be set corresponding to an application environment of each external artificial intelligence apparatus. For example, a speech recognition model for a washing machine or a refrigerator serving as an artificial intelligence apparatus may be learned by using training data including a vibration noise. In addition, a speech recognition model for a TV, a radio, or a speaker serving as an artificial intelligence apparatus may be learned by using training data including media sounds such as music or movies. In addition, a speech recognition model for a cleaner, an air purifier, a fan, or an air conditioner serving as an artificial intelligence apparatus may be learned by using training data including wind sounds.

The speech recognition result may refer to the utterance voice converted into a text. In addition, the speech recognition result may include reliability for each word of the converted text. Hereinafter, a word may refer to both a single word as well as a plurality of words.

When an input feature vector extracted from the sound data is input, the speech recognition model may output words corresponding to the utterance voice and the reliability or a weight corresponding to each of the words in an output layer. This is because the speech recognition model determines a word having the highest reliability or the highest weight value output from the output layer as a word corresponding to the utterance voice.

Then, the processor 180 of the artificial intelligence apparatus 100 obtains the sound data including the utterance voice of the user through the microphone 122 (S703).

Similar to the external artificial intelligence apparatuses, the artificial intelligence apparatus 100 may obtain the sound data including the utterance voice of the user through the microphone 122. The sound data obtained by the artificial intelligence apparatus 100 may include an utterance voice which is the same as an utterance voice included in sound data obtained by the external artificial intelligence apparatuses. Similarly, the obtained sound data may vary depending on the ambient noise, the spatial structure, the positional relation with the user, and the like.

The obtaining of the sound data may refer to converting a sound wave corresponding to the utterance voice of the user into a sound signal or sound data through the microphone 122.

Then, the processor 180 of the artificial intelligence apparatus 100 generates a speech recognition result from the obtained sound data (S705).

The processor 180 may generate the speech recognition result from the sound data obtained by using the speech recognition model stored in the memory 170.

The speech recognition model may include an artificial neural network, and may be learned by using a machine learning algorithm or a deep learning algorithm.

Training data used to train the speech recognition model may be set corresponding to an application environment of the artificial intelligence apparatus 100. As described above, when the artificial intelligence apparatus 100 is a washing machine or a refrigerator, the speech recognition model may be learned by using training data including a vibration noise. In addition, when the artificial intelligence apparatus 100 is a TV, a radio, or a speaker, the speech recognition model may be learned by using training data including media sounds such as music or movies. In addition, when the artificial intelligence apparatus 100 is a cleaner, an air purifier, a fan, or an air conditioner, the speech recognition model may be learned by using training data including wind sounds.

The speech recognition result may refer to the utterance voice converted into a text. In addition, the speech recognition result may include reliability for each word of the converted text.

The processor 180 may extract an input feature vector for speech recognition from the obtained sound data, input the extracted input feature vector to the speech recognition model, and obtain words corresponding to the utterance voice output from the output layer of the speech recognition model and reliability or a weight corresponding to each of the words as the speech recognition result.

Then, the processor 180 of the artificial intelligence apparatus 100 determines an environment variable corresponding to a speech reception environment by using the obtained sound data (S707).

The environment variable may include at least one of a noise level, a noise type, an utterance level, or positional relation. A noise refers to a sound that is not the utterance voice of the user included in the sound data, and the noise type may include at least one of media, a vibration, a conversation, a wind, or a daily life noise. The positional relation may refer to positional relation between each of the artificial intelligence apparatuses and the user.

The processor 180 may determine the environment variable by using the sound data obtained through the microphone 122 or the sound data obtained from the external artificial intelligence apparatus. When using the sound data obtained by the external artificial intelligence apparatus, the processor 180 may receive the sound data from the external artificial intelligence apparatus through the communication unit 110.

The processor 180 may determine the noise type from the sound data by using a noise classification model. The noise classification model may include an artificial neural network, and may be learned by using a machine learning algorithm or a deep learning algorithm.

The processor 180 may obtain a timestamp for a reception time of the sound data, receive the timestamp indicating the reception time of the utterance voice from each of the external artificial intelligence apparatuses through the communication unit 110, use the timestamps to calculate a reception time difference between the artificial intelligence apparatuses, determine a location of the user by using the calculated reception time difference, and determine the positional relation based on the determined location of the user. As described above, the processor 180 may determine the positional relation by using a DOA algorithm.

In addition, the processor 180 of the artificial intelligence apparatus 100 generates a final speech recognition result for the utterance voice by using the speech recognition result received from the at least one external artificial intelligence apparatus, the generated speech recognition result, and the generated environment variable (S709).

Each of the speech recognition results may include words corresponding to the utterance voice of the user and reliability corresponding to each of the words.

The processor 180 may generate the final speech recognition result by combining words having high reliability among the words included in each of the speech recognition results.

The processor 180 may determine a weight for each of the speech recognition results by using the determined environment variable, and generate the final speech recognition result based on the determined weight. In other words, the processor 180 may generate the final speech recognition result by summing up weights for each of the speech recognition results by using the determined weight.

For example, assume that the utterance voice of the user is "good day", the first speech recognition result represents the reliability of "good day" as 0.8 and the reliability of "good die" as 0.3, the second speech recognition result represents the reliability of "good day" as 0.5 and the reliability of "good die" as 0.5, the third speech recognition result represents the reliability of "good day" as 0.8 and the reliability of "good die" as 0.1, and the speech recognition results have the same weighs of ⅓, ⅓, and ⅓. In this case, the processor 180 may sum up the weights for each of the speech recognition results by using the weights to determine the reliability of "good day" as 0.7 and the reliability of "good die" as 0.3. Accordingly, the processor 180 may determine that the utterance voice of the user is "good day".

The processor 180 may determine the weights for the speech recognition results by using the environment variable corresponding to the speech reception environment at the utterance time of the user.

The processor 180 may determine a distance between each of the artificial intelligence apparatuses and the user based on the positional relation, and increase a weight for each of the artificial intelligence apparatuses as the distance between each of the artificial intelligence apparatuses and the user is shorter.

The processor 180 may compare the application environment and the noise type of each of the artificial intelligence apparatuses, and increase a weight for the artificial intelligence apparatus having the application environment corresponding to the determined noise type.

For example, if the noise type includes the media, the processor 180 may increase a weight for a speech recognition result of an artificial intelligence apparatus such as a TV, a radio, or a speaker. In addition, when the noise type includes the vibration, the processor 180 may increase a weight for an artificial intelligence apparatus such as a refrigerator or a washing machine. In addition, when the noise type includes the wind, the processor 180 may increase a weight for an artificial intelligence apparatus such as a cleaner, an air cleaner, a fan, or an air conditioner.

In particular, the processor 180 may determine the weights for the speech recognition results (or the weights for the artificial intelligence apparatuses) by using a weight determination model. When an input feature vector including at least one of the noise level, the noise type, the utterance level, or the positional relation is input, the weight determination model may output a weight for each of the speech recognition results or each of the artificial intelligence apparatuses as an output vector.

The weight determination model may include an artificial neural network, and may be learned by using a machine learning algorithm or a deep learning algorithm. For example, the weight determination model may be learned to output a weight representing the highest speech recognition success rate when the environment variable (or the input feature vector) is given by using training data including a speech recognition success rate when the weights for the speech recognition results are given.

In one embodiment, each of the external artificial intelligence apparatuses may determine the environment variable, and the artificial intelligence apparatus 100 may receive the environment variable determined from each of the artificial intelligence apparatuses through the communication unit 110. In addition, the processor 180 may determine the weights for the speech recognition results based on an environment variable determined for each of the external artificial intelligence apparatuses.

In particular, the processor 180 may determine the weight for each of the speech recognition results (or the weight for each of the artificial intelligence apparatuses) based on the noise level in each of the artificial intelligence apparatuses.

In other words, the environment variable is determined individually based on the sound data obtained from each of the external artificial intelligence apparatuses, and the weight of each of the speech recognition results is determined by using the determined environment variable, so that an actual reception environment of each of the external artificial intelligence apparatuses may be reflected more accurately.

Then, the processor 180 of the artificial intelligence apparatus 100 performs a control corresponding to the generated final speech recognition result (S711).

When the utterance voice of the user is a query, the processor 180 may provide a response corresponding to the query, and when the utterance voice of the user is a command, the processor 180 may perform the control corresponding to the command.

Figure 8:
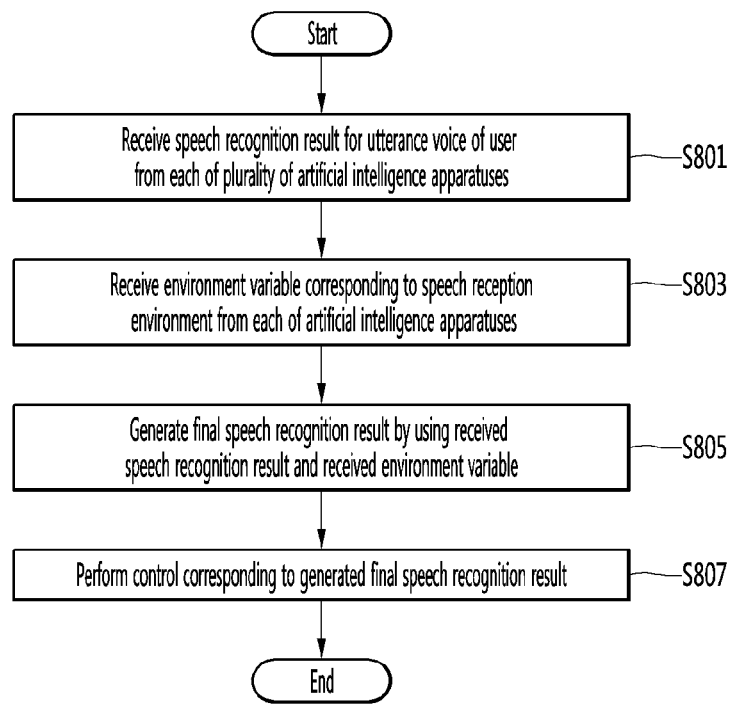
FIG. 8 is a flowchart illustrating the method of recognizing the voice of the user according to one embodiment.

FIG. 8 is a flowchart illustrating the method of recognizing the voice of the user according to one embodiment.

In detail, FIG. 8 illustrates an embodiment in which the artificial intelligence server 200 constituting the artificial intelligence system 1 operates as the master artificial intelligence apparatus to recognize the utterance voice of the user.

The redundant description of the configuration explained with reference to FIG. 7 will be omitted.

Referring to FIG. 8, the processor 260 of the artificial intelligence server 200 receives the speech recognition result for the utterance voice of the user from each of a plurality of artificial intelligence apparatuses through the communication unit 210 (S801).

The artificial intelligence apparatus is an apparatus having a microphone to perform a function of recognizing an utterance voice of a user, and refers to a slave artificial intelligence apparatus. Meanwhile, the artificial intelligence server 200 that receives speech recognition results from the artificial intelligence apparatuses refers to a master artificial intelligence apparatus.

Each of the artificial intelligence apparatuses may obtain the sound data including the utterance voice of the user, and generate the speech recognition result from the obtained sound data. In addition, the artificial intelligence server 200 may receive the speech recognition result generated from each of the artificial intelligence apparatuses.

Then, the processor 260 of the artificial intelligence server 200 receives an environment variable corresponding to a speech reception environment from each of the artificial intelligence apparatuses through the communication unit 210 (S803).

Each of the artificial intelligence apparatuses may determine the environment variable corresponding to the speech reception environment at the time of receiving the utterance voice of the user, and the artificial intelligence server 200 may receive the environment variable determined from each of the artificial intelligence apparatuses through the communication unit 210.

In addition, the processor 260 of the artificial intelligence server 200 generates a final speech recognition result by using the received speech recognition result and the received environment variable (S805).

The processor 260 may determine a weight for the speech recognition result generated by each of the artificial intelligence apparatuses based on the environment variable for each of the artificial intelligence apparatuses, and generate the final speech recognition result by using the received speech recognition result and the determined weight.

Then, the processor 260 of the artificial intelligence server 200 performs a control corresponding to the generated final speech recognition result (S807).

When the utterance voice of the user is a query, the processor 260 may provide a response corresponding to the query, and when the utterance voice of the user is a command, the processor 260 may perform the control corresponding to the command.

Figure 9:
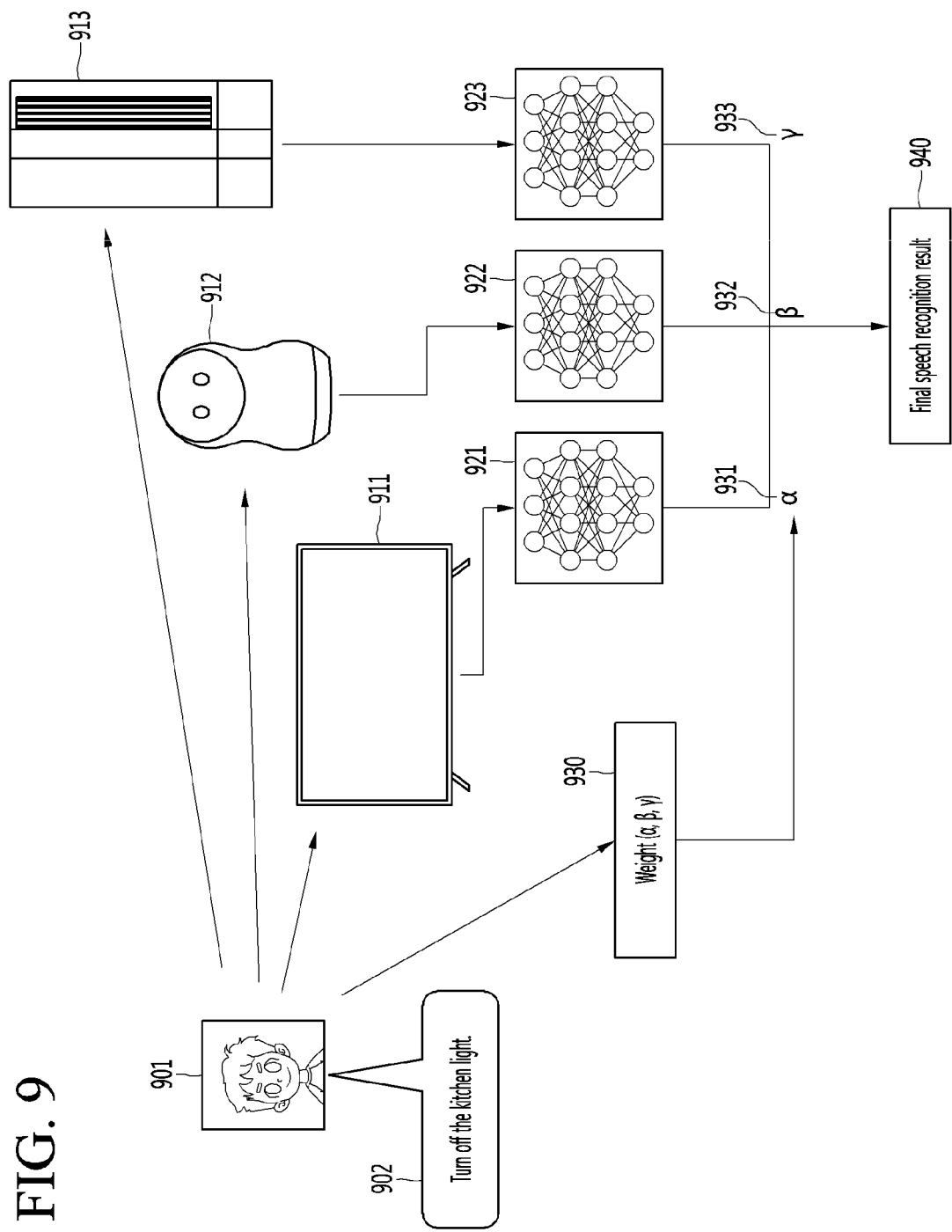
FIG. 9 is a view illustrating a method of generating a final speech recognition result according to one embodiment.

FIG. 9 is a view illustrating a method of generating a final speech recognition result according to one embodiment.

Referring to FIG. 9, when a user 901 performs an utterance 902 as "Turn off the kitchen light.", each of a TV 911 serving as a first artificial intelligence apparatus, a robot 912 serving as a second artificial intelligence apparatus, and an air conditioner 913 serving as a third artificial intelligence apparatus may obtain sound data including the utterance voice 902 of the user 901.

In FIG. 9, the master artificial intelligence apparatus may be one of the first artificial intelligence apparatus 911, the second artificial intelligence apparatus 912, or the third artificial intelligence apparatus 913, or may be an artificial intelligence server which is not shown in FIG. 9.

The master artificial intelligence apparatus may determine a weight 930 for the speech recognition result generated by each of the artificial intelligence apparatuses based on the obtained sound data.

In addition, the first artificial intelligence apparatus 911 may generate the speech recognition result for the utterance voice 902 of the user 901 from the sound data by using a first speech recognition model 921. In addition, the second artificial intelligence apparatus 912 may generate the speech recognition result for the utterance voice 902 of the user 901 from the sound data by using a second speech recognition model 922. In addition, the third artificial intelligence apparatus 913 may generate the speech recognition result for the utterance voice 902 of the user 901 from the sound data by using a third speech recognition model 923.

Further, the master artificial intelligence apparatus may generate a final speech recognition result 940 from the speech recognition results generated by each of the artificial intelligence apparatuses 911, 912, and 913 by using the determined weights 931, 932, and 933.

As shown in FIG. 9, each of the artificial intelligence apparatuses is provided with a speech recognition model. In addition, the speech recognition model may be different for each of the artificial intelligence apparatuses in which the speech recognition model is provided.

Each of the speech recognition models may be learned by using a training data set that takes into consideration an application environment of the artificial intelligence apparatus to be provided with the speech recognition model.

For example, a speech recognition model provided in an artificial intelligence apparatus such as a cleaner, a washing machine, or a refrigerator that generates a vibration may be learned by using a training data set including a vibration or a motor noise. In addition, a speech recognition model provided in an artificial intelligence apparatus such as a TV, a radio, or a speaker that plays media may be learned by using a training data set including various media noises. In addition, a speech recognition model provided in an artificial intelligence apparatus such as a cleaner, an air conditioner, or a fan that generates a wind noise may be learned by using a training data set including a wind sound. In addition, a speech recognition model provided in an artificial intelligence apparatus such as a robot or a smartphone that does not generate a large noise may be learned by using a clean training data set that does not include a noise.

Similarly, for example, the speech recognition model provided in the artificial intelligence apparatus such as the TV or the air conditioner located at a long distance (e.g., 3 m or more) from the user who utters may be learned by using a training data set including a long-distance utterance voice.

In addition, the speech recognition model provided in the artificial intelligence apparatus such as the refrigerator, the washing machine, or the robot located at a medium/short distance (e.g., 1 m to 3 m) from the user who utters may be learned by using a training data set including a medium/short-distance utterance voice. In addition, the speech recognition model provided in the artificial intelligence apparatus such as the smartphone located at a short distance (e.g., 1 m or less) from the user who utters may be learned by using a training data set including a short-distance utterance voice.

Figure 10:
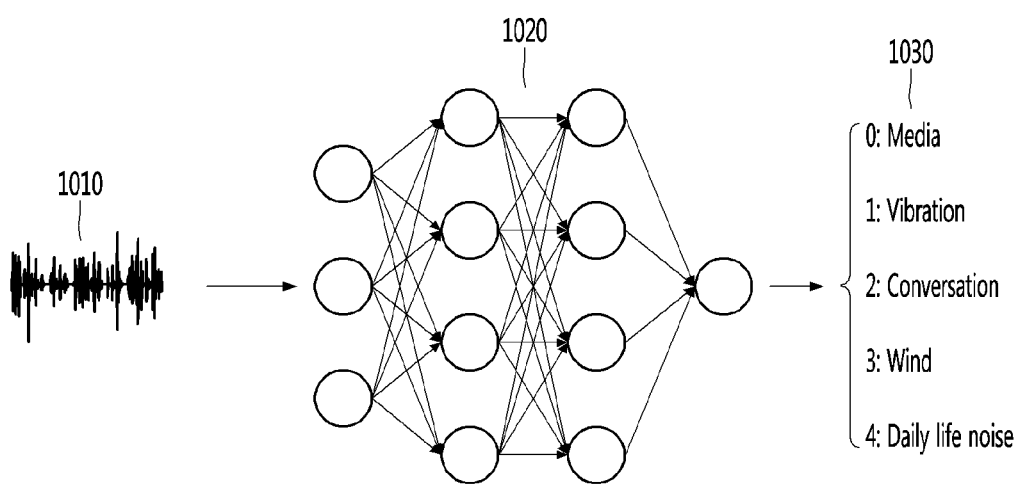
FIGS. 10 and 11 are views illustrating examples of a noise classification model according to one embodiment.
Figure 11:
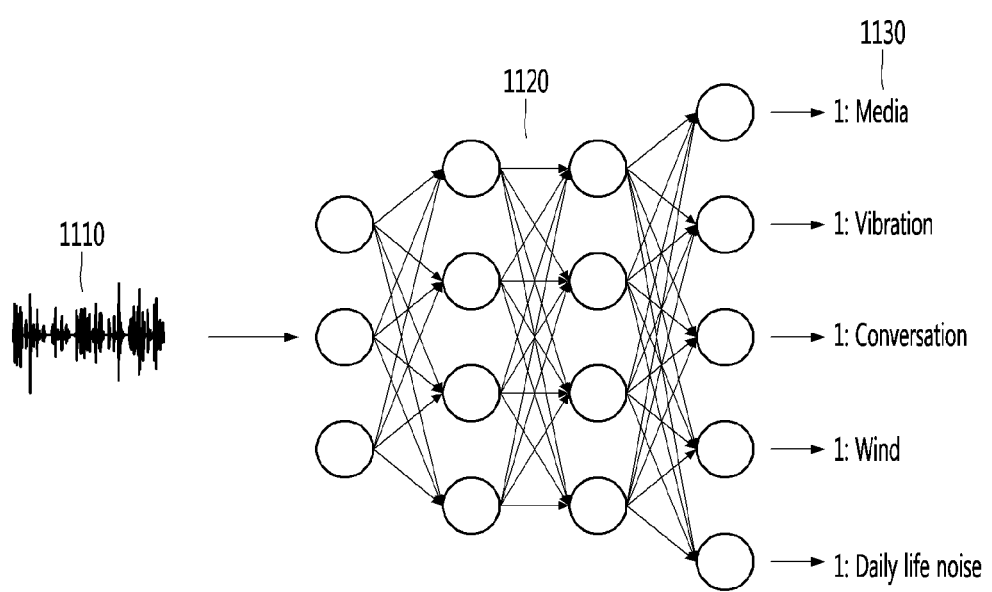

FIGS. 10 and 11 are views illustrating examples of a noise classification model according to one embodiment.

Referring to FIG. 10, sound data 1010 is input to a noise classification model 1020. In detail, an input feature vector is extracted from the sound data 1010, and the extracted input feature vector is input to an input layer of the noise classification model 1020.

In addition, the noise classification model 1020 may output a value 1030 representing a type of a noise included in the sound data 1010 from an output layer. In detail, the noise classification model 1020 illustrated in FIG. 10 may output only one value 1030 representing the noise type having the largest volume among the noise included in the sound data 1010.

For example, an output value of 0 may represent that the noise type is the media, an output value of 1 may represent that the noise type is the vibration, an output value of 2 may represent that the noise type is the conversation, an output value of 3 may represent that the noise type is the wind, and an output value of 4 may represent that the noise type is the daily life noise.

Referring to FIG. 11, sound data 1110 is input to a noise classification model 1120. In detail, an input feature vector is extracted from the sound data 1110, and the extracted input feature vector is input to an input layer of the noise classification model 1120.

In addition, the noise classification model 1120 may output a value 1130 representing a type of a noise included in the sound data 1110 from an output layer. In detail, the noise classification model 1120 illustrated in FIG. 11 may output the value 1130 representing whether the noise included in the sound data 1110 corresponds to each noise type. In other words, a first output node of the output layer may output whether the sound data 1110 includes a noise of a first noise type. Similarly, a second output node of the output layer may output whether the sound data 1110 includes a noise of a second noise type.

For example, a case where an output value of the first output node is 1 may represent that the sound data 1110 includes a noise of which the noise type is the media. In addition, a case where an output value of the second output node is 1 may represent that the sound data 1110 includes a noise of which the noise type is the vibration. In addition, a case where an output value of a third output node is 1 may represent that the sound data 1110 includes a noise of which the noise type is the conversation. In addition, a case where an output value of a fourth output node is 1 may represent that the sound data 1110 includes a noise of which the noise type is the wind. In addition, a case where an output value of a fifth output node is 1 may represent that the sound data 1110 includes a noise of which the noise type is the daily life noise.

In the noise classification model 1020 illustrated in FIG. 10, the noise included in the sound data 1010 or 1110 is classified into only one noise type. However, in the noise classification model 1120 illustrated in FIG. 11, the noise included in the sound data 1010 or 1110 may be classified into a plurality of noise types. Accordingly, when the noise classification model 1120 illustrated in FIG. 11 is used, the noise type may be more accurately determined for the sound data 1010 or 1110 including various noises, and a weight of each speech recognition result is determined based on the determined noise type, so that speech recognition accuracy may be increased.

According to various embodiments, the weight is determined in consideration of speech recognition characteristics of each of the artificial intelligence apparatuses, and the speech recognition results are collected based on the determined weight, so that a speech recognition rate can be increased.

According to an embodiment of the present invention, the above-described method may be implemented as a processor-readable code in a medium where a program is recorded. Examples of a processor-readable medium may include read-only memory (ROM), random access memory (RAM), CD-ROM, a magnetic tape, a floppy disk, and an optical data storage device.

What is claimed is:

1. An artificial intelligence apparatus for recognizing an utterance voice of a user, the artificial intelligence apparatus comprising:
    a communication unit configured to communicate with at least one external artificial intelligence apparatus which obtains first sound data including the utterance voice of the user to generate first speech recognition results from the first sound data;
    a microphone configured to obtain second sound data including the utterance voice; and
    a processor configured to:
    receive the first speech recognition results from each of the at least one external artificial intelligence apparatus;
    generate a second speech recognition result from the second sound data;
    generate a final speech recognition result for the utterance voice based on the first speech recognition results, the second speech recognition result and an environment variable; and
    perform a control corresponding to the final speech recognition result,
    wherein the processor generating the final speech recognition result is further configured to:
    determine the environment variable corresponding to an utterance time point of the user by using the second sound data,
    input the environment variable to a weight determination model,
    obtain weights for speech recognition results that output from the weight determination model,
    assign one or more weight from among the weights to the first speech recognition results and assign another weight from among the weights to the second speech recognition result,
    sum weighted first speech recognition results and a weighted second speech recognition result, and
    generate the final speech recognition results based on the sum,
    wherein the environment variable includes at least one of a noise level, a noise type, an utterance level, or positional relation, and
    wherein the weight determination model includes an artificial neural network.

2. The artificial intelligence apparatus according to claim 1, wherein the at least one external artificial intelligence apparatus generates the first speech recognition results from the first sound data by using a first speech recognition model corresponding to each of the at least one external artificial intelligence apparatus, and the processor is configured to generate the second speech recognition result from the second sound data by using a second speech recognition model.

3. The artificial intelligence apparatus according to claim 2, wherein the first speech recognition model and the second speech recognition model include an artificial neural network and are learned by using a machine learning algorithm or a deep learning algorithm.

4. The artificial intelligence apparatus according to claim 3, wherein each of the first speech recognition model and the second speech recognition model is learned by using training data corresponding to an application environment.

5. The artificial intelligence apparatus according to claim 1, wherein the noise type includes at least one of media, a vibration, a conversation, a wind, or a daily life noise.

6. The artificial intelligence apparatus according to claim 5, wherein the processor is configured to:
increase weights for a TV, a radio, and a speaker if the noise type includes the media;
increase weights for a refrigerator and a washing machine if the noise type includes the vibration; and
increase weights for a cleaner, an air purifier, a fan, and an air conditioner if the noise type includes the wind.

7. The artificial intelligence apparatus according to claim 1, wherein the processor is configured to determine the noise type from the second sound data by using a noise classification model.

8. The artificial intelligence apparatus according to claim 7, wherein the noise classification model includes an artificial neural network and is learned by using a machine learning algorithm or a deep learning algorithm.

9. The artificial intelligence apparatus according to claim 1, wherein the processor is configured to:
determine a distance from each of the artificial intelligence apparatuses to the user based on the positional relation; and
increase a weight for each of the artificial intelligence apparatuses as the distance is shorter.

10. The artificial intelligence apparatus according to claim 1, wherein the processor is configured to:
receive a first timestamp for a time point of receiving the first sound data from each of the at least one external artificial intelligence apparatus;
obtain a second timestamp for a time point of receiving the second sound data;
calculate a reception time difference in the at least one external artificial intelligence apparatus based on the first timestamp and the second timestamp;
determine a location of the user based on the reception time difference; and
determine the positional relation based on the determined location of the user.

11. A method for recognizing an utterance voice of a user, the method comprising:
receiving first speech recognition results from each of at least one external artificial intelligence apparatus which obtains first sound data including the utterance voice of the user to generate the first speech recognition results from the first sound data;
obtaining second sound data including the utterance voice;
generating a second speech recognition result from the second sound data;
generating a final speech recognition result for the utterance voice based on the first speech recognition results, the second speech recognition result and an environment variable; and
performing a control corresponding to the final speech recognition result,
wherein the method further comprises:
determining the environment variable corresponding to an utterance time point of the user by using the second sound data;
inputting the environment variable to a weight determination model;
obtaining weights for speech recognition results that output from the weight determination model;
assigning one or more weights from among the weights to the first speech recognition results and assigning another weight from among the weights to the second speech recognition result;
summing weighted first speech recognition results and a weighted second speech recognition result to generate a sum; and
generating the final speech recognition results based on the sum,
wherein the environment variable includes at least one of a noise level, a noise type, an utterance level, or positional relation, and
wherein the weight determination model includes an artificial neural network.

12. A non-transitory recording medium recorded with a program to perform a method for recognizing an utterance voice of a user, wherein the method includes:
receiving first speech recognition results from each of at, least one external artificial intelligence apparatus which obtains first sound data including the utterance voice of the user to generate the first speech recognition results from the first sound data;
obtaining second sound data including the utterance voice;
generating a second speech recognition result from the second sound data;
generating a final speech recognition result for the utterance voice based on the first speech recognition results, the second speech recognition result and an environment variable; and
performing a control corresponding to the final speech recognition result,
wherein the method further comprises:
determining the environment variable corresponding to an utterance time point of the user by using the second sound data;
inputting the environment variable to a weight determination model;
obtaining weights for speech recognition results that output from the weight determination model;
assigning one or more weights from among the weights to the first speech recognition results and assigning another weight from among the weights to the second speech recognition result;
summing weighted first speech recognition results and a weighted second speech recognition result to generate a sum; and
generating the final speech recognition results based on the sum,
wherein the environment variable includes at least one of a noise level, a noise type, an utterance level, or positional relation, and wherein the weight determination model includes an artificial neural network.

\* \* \* \* \*